(12) United States Patent
Anderson

(10) Patent No.: US 12,094,290 B2
(45) Date of Patent: Sep. 17, 2024

(54) SYSTEMS AND METHODS FOR VERIFICATION USING ENCODED GLYPHS

(71) Applicant: Aristocrat Technologies Australia Pty Limited, North Ryde (AU)

(72) Inventor: Philip Jeffrey Anderson, Las Vegas, NV (US)

(73) Assignee: Aristocrat Technologies Australia Pty Limited, North Ryde (AU)

(*) Notice: Subject to any disclaimer, the term of this patent is extended or adjusted under 35 U.S.C. 154(b) by 996 days.

(21) Appl. No.: 16/415,532

(22) Filed: May 17, 2019

(65) Prior Publication Data

US 2019/0272706 A1 Sep. 5, 2019

Related U.S. Application Data

(63) Continuation of application No. 11/934,349, filed on Nov. 2, 2007, now Pat. No. 10,319,181.

(60) Provisional application No. 60/865,294, filed on Nov. 10, 2006.

(51) Int. Cl.
*G07F 17/32* (2006.01)
*G06F 21/16* (2013.01)

(52) U.S. Cl.
CPC .......... *G07F 17/3241* (2013.01); *G06F 21/16* (2013.01); *G07F 17/32* (2013.01)

(58) Field of Classification Search
CPC .............................. G06F 21/16; G07F 17/3241
See application file for complete search history.

(56) References Cited

U.S. PATENT DOCUMENTS

| | | | |
|---|---|---|---|
| 6,424,338 B1* | 7/2002 | Anderson | G06F 3/0213 345/177 |
| 6,915,020 B2 | 7/2005 | Damera-Venkata | |
| 7,971,017 B1* | 6/2011 | Mann | G06F 21/123 726/32 |
| 2003/0085800 A1* | 5/2003 | Li | G07F 7/122 340/5.86 |
| 2004/0013284 A1* | 1/2004 | Yu | G06T 1/0028 382/100 |
| 2004/0127277 A1* | 7/2004 | Walker | H04L 63/08 463/16 |
| 2006/0080175 A1* | 4/2006 | Rowe | G06Q 30/0209 463/16 |
| 2007/0002362 A1* | 1/2007 | Kacker | G06V 20/13 358/1.14 |
| 2007/0060302 A1* | 3/2007 | Fabbri | G07F 17/32 463/24 |
| 2007/0205288 A1* | 9/2007 | Laser | G06K 7/12 235/462.46 |

FOREIGN PATENT DOCUMENTS

WO WO-2006112866 A2 * 10/2006 ....... G06K 19/06037

* cited by examiner

*Primary Examiner* — Jay Huang
(74) *Attorney, Agent, or Firm* — Armstrong Teasdale LLP

(57) ABSTRACT

Certain embodiments of the present invention provide a verification system including a processor adapted to generate a glyph for at least one component of a computing system, a display adapted to display the glyph, and a scanner adapted to scan the glyph from the display. The computing system includes the processor and the display. The scanner is adapted to verify the at least one component of the computing system based at least in part on the glyph.

19 Claims, 4 Drawing Sheets

SYSTEMS AND METHODS FOR VERIFICATION USING ENCODED GLYPHS

RELATED APPLICATIONS

This application is a continuation and claims the benefit of U.S. patent application Ser. No. 11/934,349, filed on Nov. 2, 2007 and entitled "SYSTEMS AND METHODS FOR VERIFICATION USING ENCODED GLYPHS," which claims the benefit of U.S. Provisional Patent Application No. 60/865,294, filed on Nov. 10, 2006, both of which are hereby incorporated by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention generally relates to verification in computing systems. More specifically, the present invention relates to systems and methods for verification using encoded data glyphs.

Data glyph technology is a category, like bar coding, where data is embedded for use in image applications. Data glyph technology encodes digital information in the form of binary 1's and 0's that are in turn rendered in the form of indistinguishable shaped marks such as small linear marks. Each mark generally represents a digit of binary data. U.S. Pat. No. 6,915,020, the disclosure of which is incorporated by reference, discloses glyph technology and usage thereof.

In many computing systems, including casino gaming devices, it is often desirable to verify one or more components including hardware, software, and/or firmware of the system. That is, verification allows one or more components of the system to be shown to be operating correctly and/or in a previously approved form and/or has been approved in a particular gaming jurisdiction. Verification may be viewed to include validation and authentication. The former may refer to a form of verification that includes checking that the component being validated originated from a known or trusted source and that the component has not been tampered with. Authentication may refer to a form of verification that includes determining that a component comes from an approved, known, or trusted source. As used herein, verification is intended to encompass the concept that a component is as it seems and has not been altered or corrupted. Authentication may encompass digital signatures or the like.

In gaming devices, regulatory agencies often will require that currently running gaming software be at least verified. Currently, the cabinet of a gaming device must be opened in order for the device to be verified because physical access to the verification interface is restricted. The current verification process, including stopping game play at the device, opening the cabinet, and performing the verification, is time consuming. The game personality memory device such as an EPROM must be removed from the game and connected to a device to compare and verify the data. In addition, the down time required may result in lost revenue since the game has been removed from play.

BRIEF SUMMARY OF THE INVENTION

Certain embodiments of the present invention provide a verification system including a processor adapted to generate a glyph for at least one component of a computing system, a display adapted to display the glyph, and a scanner adapted to scan the glyph from the display. The computing system includes the processor and the display. The scanner is adapted to verify the at least one component of the computing system based at least in part on the glyph.

Certain embodiments of the present invention provide a method of verification including generating a glyph for a game, displaying the glyph, and verifying the game based at least in part on the displayed glyph. The game is adapted to run on a gaming device. The glyph is displayed on the gaming device. In certain embodiments, the glyph may be imbedded within certain graphics or text to be indiscernible to the naked eye.

Certain embodiments of the present invention provide a computer-readable medium including a set of instructions for execution on a computer, the set of instructions including a glyph generation routine, a display routine, and a verification routine. The glyph generation routine is configured to generate a glyph for a game. The game is adapted to run on a gaming device. The display routine is configured to display the glyph on the gaming device. The verification routine is configured to verify the game based at least in part on the displayed glyph.

Certain embodiments of the present invention provide a gaming device including a game memory, a display adapted to display a glyph, and a processor adapted to generate the glyph for the game memory. The glyph is based at least in part on the contents of the game memory. The glyph is adapted to be scanned to verify the contents of the game memory.

Figure 1:
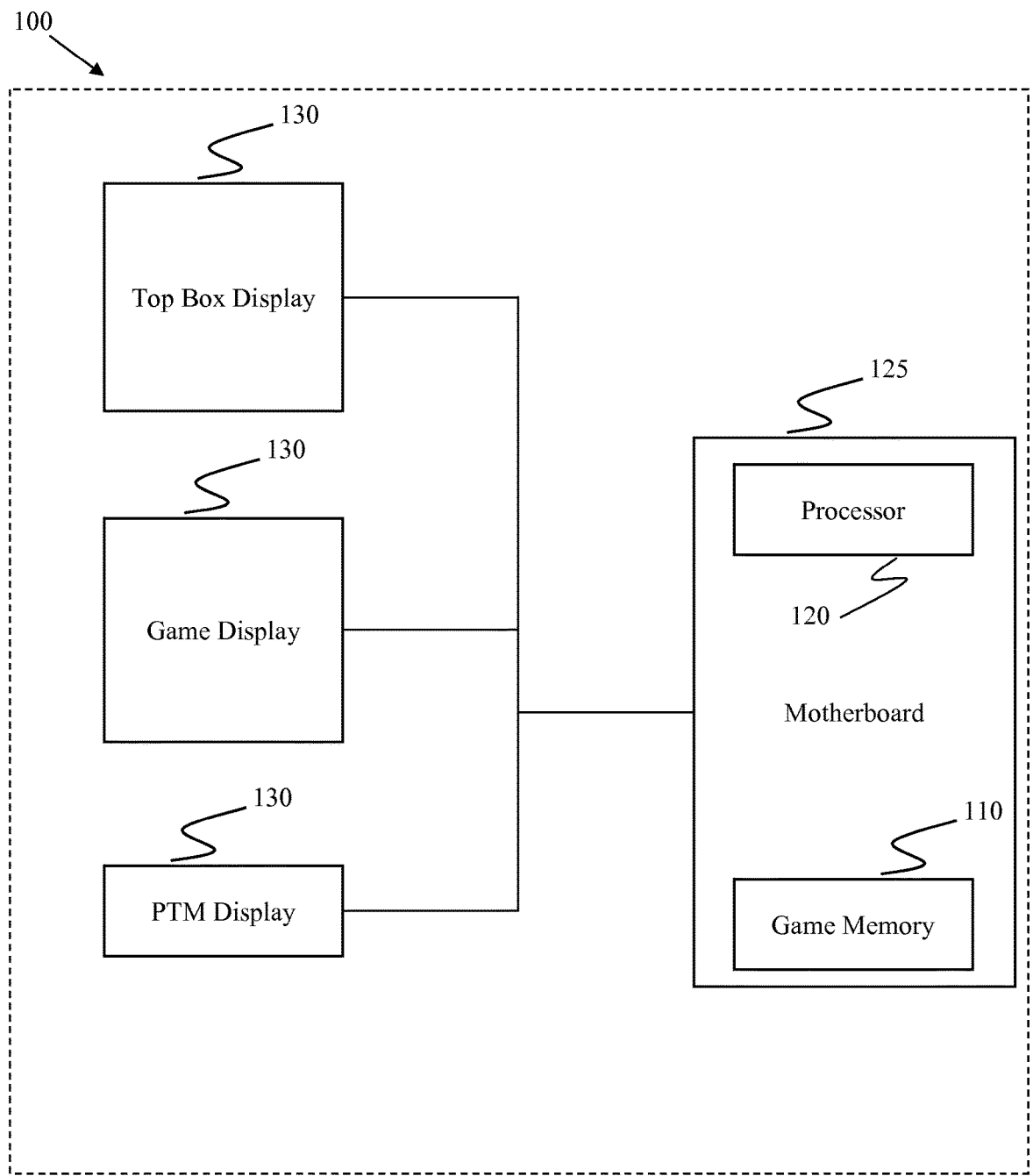
FIG. 1 illustrates a gaming device according to an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Gaming terminals, electronic gaming tables, and other gaming devices may be located in a local gaming environment, such as a casino, or a multi-site gaming environment, such as a plurality of networked casinos. Gaming devices may also be located in non-traditional gaming environments, such as restaurants, stores, and/or airports. Gaming devices may be used to play one or more games employing one or more rewards.

The requirements and operating characteristics for games vary from one regulated gaming jurisdiction to another. As such gaming devices may be approved in one form in one jurisdiction and in another form in another jurisdiction. The game personality EPROM or other memory device stores code for the operation of the game. Shipping or providing a game where the components such as the game operating code has not been approved by the controlling jurisdiction can result in the regulators requiring the game to be withdrawn from play and/or issuing sanctions against the manufacturer.

In addition to the foregoing, it may become necessary to check the gaming device in the field or before installation in the field to make sure that the game is verified. This verification has been done in the past by opening up the gaming device cabinet, removing the game EPROM chip, and placing it in a reading device to compare the code and verify it.

Where game code is downloaded to a gaming terminal, it would be advantageous to be able to verify the game code in a fast, efficient, and non-obtrusive fashion. For example, the downloaded game code may be internally verified (and perhaps authenticated); but it would be advantageous to provide a technique to separately verify aspects of the game.

When a game is prepared for shipment to a customer it would be advantageous to provide for an easy check that the operating code such as the game code is verified (not corrupted) and is verified for the gaming jurisdiction to receive the game.

The glyph technology of the presently described invention may also be used to verify software or device adapted to run on a gaming device peripheral such as a bill validator, ticket printer, display, cash acceptor or other device. For example, the glyph may validate peripheral operating software, identification of the device or its configuration.

FIG. 1 illustrates a gaming device 100 according to an embodiment of the present invention. The gaming device 100 includes a game memory 110, a processor 120, a motherboard 125, and one or more displays 130.

The motherboard 125 is in communication with the game memory 110 and the processor 120. The motherboard 125 is in communication with the one or more displays 130. In certain embodiments, the motherboard 125 includes the game memory 110. In certain embodiments, the motherboard 125 includes the processor 120.

In operation, the motherboard 125 and processor 120 provide a game to a user based at least in part on data included in the game memory 110. The game is presented to the user through at least one of the displays 130. A glyph is generated by the processor 120 based at least in part on the game memory 110. The glyph is then displayed on one or more of the displays 130.

The glyph may represent a hash value for the game or other generated verification "tag" or selected segments or modules of the code sufficient to provide at least a rough verification of the game and its version, e.g. the "Nevada" version versus the "Mississippi" version where the versions differ.

The game memory 110 may include an electrically programmable read-only memory (EPROM), for example, programmed at the factory. In certain embodiments, the game memory 110 includes a downloadable game. For example, the game memory 110 may include a game downloaded from a server or over the Internet. In certain embodiments, the game memory 110 includes more than one game. For example, in a multi-game gaming machine, a user may select from two or more games to play on a particular gaming device 100. Game code memory may also be provided in a flash memory, hard drive, or other memory, for example.

The display 130 may include a game display, a top box display, and/or a player tracking module (PTM) display, for example.

The processor 120 is adapted to generate a glyph. The glyph may be generated continuously or the device may be provided with a switch or command to cause the processor 120 to generate the glyph. For example, the gaming device may be provided with an internal switch to prompt the processor 120 to generate the glyph. External switches, card readers wireless or wired switches may also be used to generate the prompt. The glyph may represent code (or encrypted code or a hash or message digest) which relates to information regarding the game version, approval, approval jurisdictions, serial number, providence (e.g., associated game serial number, and owner), an encrypted serial number, denomination, original set-up including peripherals such as bill validators, display(s) or ticket printers, vendor, customer, install date, version, licensee, and/or licensor, for example. Alternatively, the glyph may provide a code and/or identifier that may be correlated with such data. The glyph may also include unrelated data such as a watermark, image, alphanumeric tag, or the like, whereby the manufacturer can determine whether the code has been copied.

The glyph may be used to verify a component of the gaming device 100. For example, the glyph may be used to check the validation, authorization, and/or providence of the game software, the game memory 110, and/or system, for example. The glyph would allow a component of the gaming device 100 to be checked via one or more of the displays such as display 130, by, when the glyph is displayed, walking by with a scanner and without opening the cabinet, for example. For example, regulators could verify the game and/or gaming memory 110 using the glyph and a scanner. When the glyph is displayed, an optical scanner could discern and decipher the data represented by the glyph and compare the deciphered glyph with known data to verify the game, device or component. For example, a regulator in Nevada with a scanner could verify all games on a casino floor by scanning the glyphs on the display. The glyphs may be displayed as by a series of lines or may be displayed as embedded in another graphic display such as an image or textual material, e.g., the pay table display or help screen. As another example, a manufacturer could scan the glyph to perform a final or random check to verify the software or gaming device. Before the game leaves the factory, the game could be powered up and the glyph would be displayed and scanned to confirm the proper set-up. As another example, the glyph may be used to confirm the validity of a game download.

The glyph may be generated based at least in part on the game memory 110. For example, the glyph may be generated based on one or more games stored in the game memory 110. For example, the value and/or form of the glyph may be determined by performing a computation on at least part of the data stored in the game memory 110. As an example, a hash value of the game code and set-up data may be used to generate the glyph for display. The scanner would read the glyph and from it determine the hash value to compare and verify the data. Where a game is downloaded the download to the gaming device may itself include a hash, digital signature or other verifying data. This verifying data would be used to generate the glyph.

The glyph may be displayed on one or more of the displays 130, for example. The glyph may be displayed on a gaffed display, help screen, icon, game screen, bonus screen, and/or PTM display, for example.

In certain embodiments, the glyph is difficult to see or distinguish by a player. That is, the glyph may be "invisible" to the player as by being embedded in a images such as graphics or textual display. For example, the glyph may be presented on a display 130 using a low-contrast color. As another example, the glyph may be displayed as a grayscale or yellow feature. As another example, the glyph may be hidden within an icon or image on the display 130. As another example, the glyph may be placed in a corner of the display 130, away from elements the user interacts with.

In certain embodiments, the glyph is encrypted. The data is encrypted and then is used to generate the corresponding glyph. The glyph might be displayed as angled lines, characters, or the like.

Figure 2:
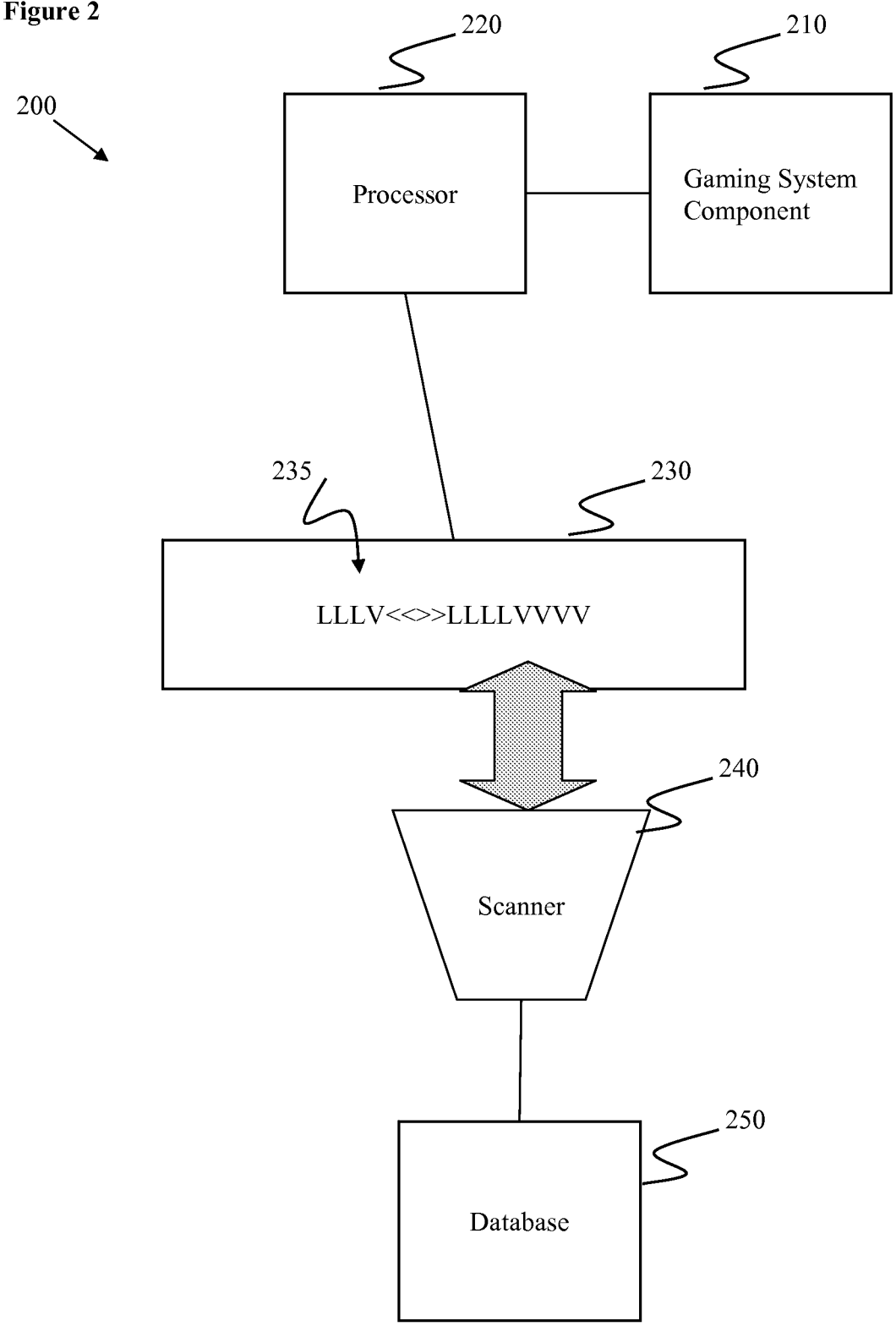
FIG. 2 illustrates a verification system according to an embodiment of the present invention.

FIG. 2 illustrates a verification system 200 according to an embodiment of the present invention. The verification system 200 includes a gaming system component 210, a processor 220, a display 230, a scanner 240, and a database 250.

The processor 220 is in communication with the gaming system component 210 and the display 230. The scanner 240 is in communication with the database 250.

The display 230 is adapted to display a glyph 235. The scanner 240 is adapted to scan the display 230.

In operation, the processor 220 is adapted to generate the glyph 235 based at least in part on the gaming system component 210. The display 230 then displays the glyph 235. The scanner 240 then scans the glyph 235 from the display 230. The gaming system component 210 is verified based on the scanned glyph 235 and verification data stored in the database 250.

The gaming system component 210 may include a game memory, similar to the game memory 110, described above, for example. The gaming system component 210 may include hardware, software, and/or firmware in a gaming device similar to the gaming device 100, described above, for example. The processor 220 may be similar to the processor 120, described above, for example. The display 230 may be similar to the displays 130, described above, for example.

The scanner 240 may scan the glyph 235 from the display in a variety of ways. For example, the scanner 240 may optically scan the glyph 235. As another example, the scanner 240 may include an infrared scanner to read the glyph 235. In certain embodiments, the glyph is audible rather than visual. For example, the glyph 235 may include one or more sounds or tones and the scanner 240 may include a microphone to scan the glyph 235. The scanner 240 may be a hand-held scanner or reader, for example.

The glyph 235 may be similar to the glyph discussed above, for example. The glyph 235 may be encoded to provide information regarding approval, approval jurisdictions, serial number, providence (e.g., associated game serial number, and owner), an encrypted serial number, vendor, customer, install date, version, licensee, and/or licensor, for example. Alternatively, the glyph 235 may provide a code and/or identifier that may be correlated with such data.

The glyph 235 may be used to verify the gaming system component 210. The glyph 235 may allow the gaming system component 210 to be checked via the display 230 by walking by with a scanner and without opening the cabinet, for example. For example, regulators could verify the gaming system component 210 using the glyph 235 and the scanner 240. As another example, a manufacturer could scan the glyph 235 to perform a final or random check to verify the gaming system component 210.

The glyph 235 may be generated based at least in part on the gaming system component 210. For example, the glyph 235 may be generated based on one or more games stored in a game memory. For example, the value and/or form of the glyph 235 may be determined by performing a computation on at least part of the data stored in the game memory.

In certain embodiments, the glyph 235 is difficult to see or distinguish by a player. That is, the glyph 235 may be "invisible" to the player. For example, the glyph 235 may be presented on the display 230 using a low-contrast color or embedded in an image or text. As another example, the glyph 235 may be displayed as a grayscale or yellow feature. As another example, the glyph 235 may be hidden within an icon or image on the display 230. As another example, the glyph 235 may be placed in a corner of the display 230, away from elements the user interacts with.

The database 250 may include verification data. The verification data may be for gaming system component 210, for example. That is, the verification data in the database 250 may be used to verify the gaming system component 210 at least in part in conjunction with the glyph 235. The verification data may be generated as part of the manufacturing process, for example.

In certain embodiments, the database 250 is a regulatory database. For example, the regulatory database may include verification information for games approved for a particular casino or within a particular jurisdiction. In certain embodiments, the database 250 is a master database. For example, the master database may include game data by which the regulator can compare the data corresponding the glyph as read in the field to verify the game or other data.

In certain embodiments, the scanner 240 may upload data based at least in part on the scanned glyph 235. The scanner 240 may send the data to the database 250 to be stored for records maintenance, for example. The data may be sent over a wired or wireless network, for example. The regulator, manufacturer or operator may read the glyphs and upload the data to the database 250 to verify the game or other data, provide a date of the verification, the person verifying the game, or other relevant data for archival purposes. Certain embodiments of the present invention may be used in non-gaming applications. For example, software vendors could check software via a screen saver, displayed icon, and/or a gaffed display, for example. A company may wish to verify that all versions of a particular software used in the company are genuine and within their software license. For equipment such as radar displays, or other equipment displays, it would also be advantageous to verify the software on a routine basis to make sure the data has not been corrupted and is genuine. Further, this technique may also be useful to verify that downloaded or loaded software has been accepted, loaded, and is genuine.

Figure 3:
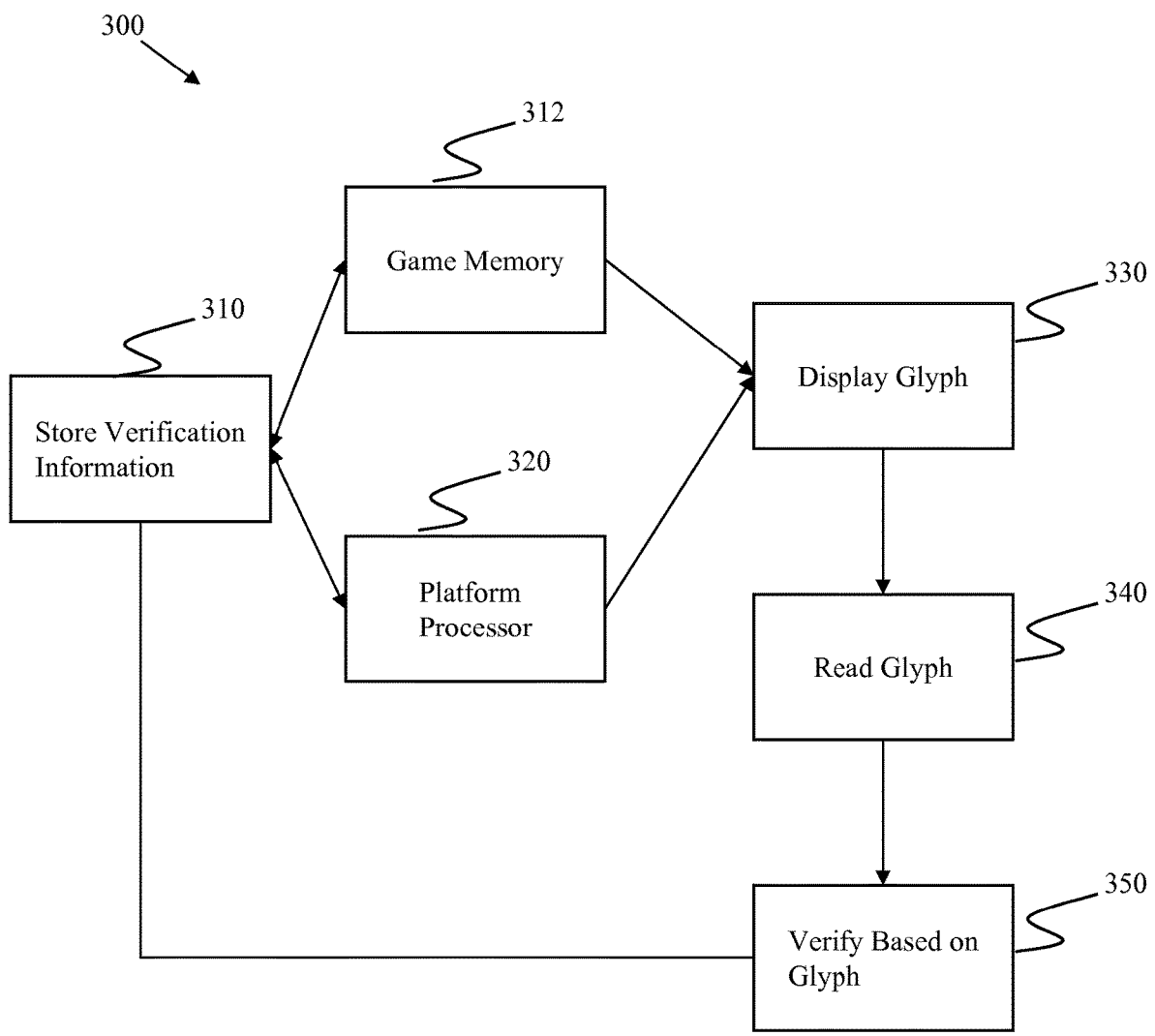
FIG. 3 illustrates a flow diagram for a method for verifying a gaming device according to an embodiment of the present invention.

FIG. 3 illustrates a flow diagram for a method 300 for verifying a gaming device according to an embodiment of the present invention. The method 300 includes the following steps, which will be described below in more detail. At step 310, verification information is stored. At step 330, a glyph is displayed. At step 340, the glyph is read. At step 350, verification is performed based on the glyph. The method 300 may be described with reference to elements of systems described above, but it should be understood that other implementations are possible.

At step 310, verification information is stored. The verification information may be stored in a database similar to the database 250, described above, for example. The verification information may be for the game memory 312. The verification information may be for a gaming system component similar to the gaming system component 210, described above, for example. The verification information may be stored as part of the manufacturing process, for example.

In certain embodiments, the verification information may be stored in a regulatory database. For example, the regulatory database may include verification information for games approved for a particular casino or within a particular jurisdiction. In certain embodiments, the verification information may be stored in a master database. For example, the master database may include information regarding all manufacturers and their approved games. This database may be accessed (or accessible) via the scanner to verify the data sought to be verified.

At step 330, a glyph is displayed. The glyph may be similar to the glyph 235, described above, for example. The glyph may be displayed on a display similar to display 130 and/or 230, described above, for example. The display may include a game display, a top box display, and/or a PTM display, for example. The glyph may be displayed on one or more of displays, for example. The glyph may be displayed on a gaffed display, help screen, icon, game screen, bonus screen, and/or PTM display, for example. The display may be continuous, may require a prompt, or may be displayed at a separate screen that can be called up by a prompt such as by calling up the "Help" screen, for example.

In certain embodiments, the glyph is generated based at least in part on the game memory 312. The glyph may be generated by the processor 320, for example. The processor 320 may be similar to the processor 120 and/or the processor 220, described above, for example.

The glyph may be encoded to provide information regarding approval, approval jurisdictions, serial number, providence (e.g., associated game serial number, and owner), an encrypted serial number, vendor, customer, install date, version, licensee, and/or licensor, for example. Alternatively, the glyph may provide a code and/or identifier that may be correlated with such data.

The glyph may be used to verify the game memory 312 and/or the content of the game memory 312. The glyph may allow the game memory 312 to be checked via a display by walking by with a scanner and without opening the cabinet, for example. For example, regulators could verify the game memory 312 using the glyph and a scanner. As another example, a manufacturer could scan the glyph to perform a final or random check to verify the game memory 312.

The glyph may be generated based at least in part on the game memory 312. For example, the glyph may be generated based on one or more games stored in the game memory 312. For example, the value and/or form of the glyph may be determined by the processor 320 performing a computation on at least part of the data stored in the game memory 312.

In certain embodiments, the glyph is difficult to see or distinguish by a player. That is, the glyph may be "invisible" to the player. For example, the glyph may be presented on a display using a low-contrast color. As another example, the glyph may be displayed as a grayscale or yellow feature. As another example, the glyph may be hidden within an icon or image on a display. As another example, the glyph may be placed in a corner of a display, away from elements the user interacts with.

At step 340, the glyph is read. The glyph may be the glyph displayed at step 330, described above, for example. The glyph may be read by a scanner similar to scanner 210, described above, for example.

The scanner may read the glyph from the display in a variety of ways. For example, the scanner may optically scan the glyph. As another example, the scanner may include an infrared scanner to read the glyph. The scanner may be a hand-held scanner or reader, for example.

At step 350, verification is performed based on the glyph. The verification may be performed by a scanner, similar to the scanner 240, described above, for example. The verification may be based on the glyph and verification data stored in step 310, described above, for example. In one embodiment, the scanner 240 may contain verification data stored in a data structure in the scanner 240. In another embodiment the scanner 240 may communicate, for example through a wireless network, with a host computer either on site or remote (at for example a site controlled by regulators) to conduct the verification.

One or more of the steps of the method 300 may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

Figure 4:
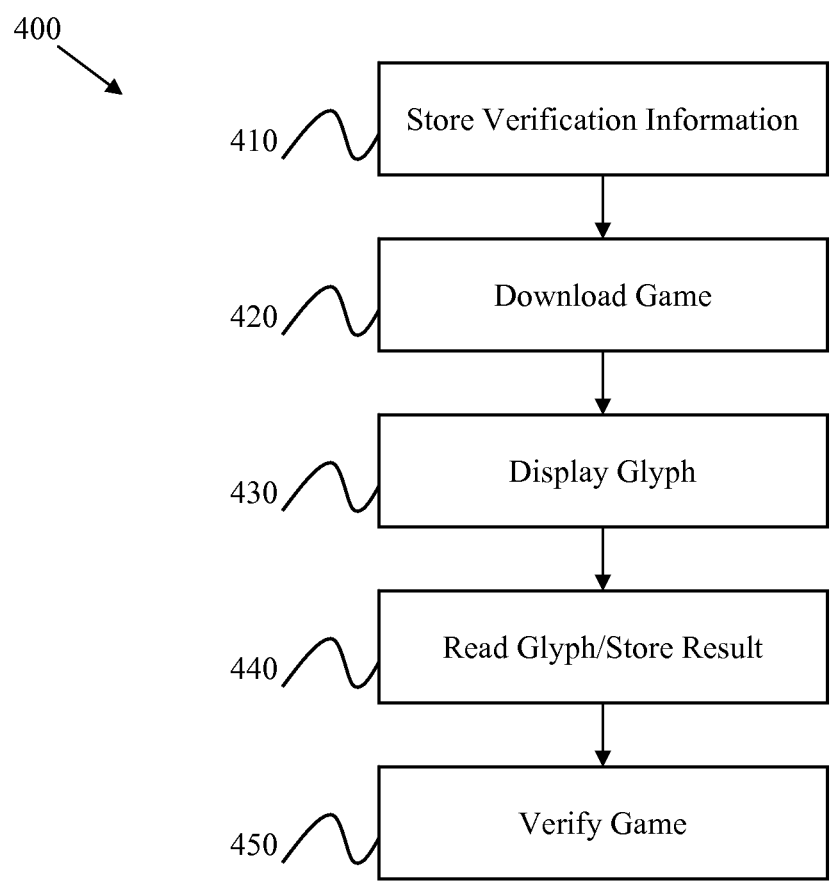
FIG. 4 illustrates a flow diagram for a method for verifying a gaming device according to an embodiment of the present invention.

FIG. 4 illustrates a flow diagram for a method 400 for verifying a gaming device according to an embodiment of the present invention. The method 400 includes the following steps, which will be described below in more detail. At step 410, verification information is stored. At step 420, a game is downloaded. At step 430, a glyph is displayed. At step 440, the glyph is read. At step 450, the game is verified. The method 400 is described with reference to elements of systems described above, but it should be understood that other implementations are possible.

At step 410, verification information is stored. The verification information may be stored in a database similar to the database 250, described above, for example. The verification information may be for a gaming system component similar to the gaming system component 210, described above, for example. The verification information may be stored as part of the manufacturing process, for example.

In certain embodiments, the verification information may be stored in a regulatory database. In certain embodiments, the verification information may be stored in a master database.

At step 420, a game is downloaded. The game may be downloaded to a gaming machine, for example. The game may be downloaded over a network, for example. For example, a game may be downloaded to a gaming device in a casino. As another example, a game may be downloaded over the Internet to a personal computer.

At step 430, a glyph is displayed. The glyph may be similar to the glyph 235, described above, for example. The glyph may be displayed on a display similar to display 130 and/or 230, described above, for example. The display may include a game display, a top box display, and/or a PTM display, for example. The glyph may be displayed on one or more displays, for example. The glyph may be displayed on a gaffed display, help screen, icon, game screen, bonus screen, and/or PTM display, for example.

In certain embodiments, the glyph is generated based at least in part on a gaming system component. The glyph may be generated by a processor, for example. The processor may be similar to the processor 120, the processor 220, and/or the processor 320, described above, for example.

At step 440, the glyph is read. The glyph may be the glyph displayed at step 430, described above, for example. The glyph may be read by a scanner similar to scanner 210, described above, for example.

The scanner may read the glyph from the display in a variety of ways. For example, the scanner may optically scan the glyph. As another example, the scanner may include an infrared scanner to read the glyph. The scanner may be a hand-held scanner or reader, for example.

At step 450, the game is verified. The verification may be performed by a scanner, similar to the scanner 240, described above, for example. The verification may be based on the glyph and verification data stored in step 410, described above, for example.

One or more of the steps of the method 400 may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

Certain embodiments may be implemented in software, firmware, and/or hardware, for example. For example, certain embodiments may be implemented as a set of instructions or routines stored on a machine-readable medium, such as a CD, DVD, CD-ROM, DVD-ROM, hard disk, floppy disk, RAM, ROM, flash memory, and/or other medium, for execution on a computer and/or other processing device. Certain embodiments may be implemented on a standalone gaming terminal, a bank of gaming terminals, a network of gaming terminals, and/or a client-server system communicating with one or more gaming terminals and/or other devices, for example.

Thus, certain embodiments of the present invention provide systems and methods for verification using encoded glyphs. Certain embodiments provide for verifying a gaming device using a glyph. Certain embodiments provide for scanning a glyph. Certain embodiments of the present invention have a technical effect of verification using encoded glyphs. Certain embodiments have a technical effect of verifying a gaming device using a glyph. Certain embodiments have a technical effect of scanning a glyph.

While the invention has been described with reference to one or more preferred embodiments, those skilled in the art will understand that changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

The invention claimed is:

1. A server system for verifying software or hardware, the server system comprising:
a memory; and
a processor configured to execute instructions stored in the memory, which when executed, cause the processor to at least:
receive verification data from a scanning device that scans a glyph to capture the verification data, wherein the verification data is received as part of a verification before a computing device is shipped, wherein the verification data is associated with at least one of software or hardware of the computing device and comprises a hash value of at least part of a verification identifier of the at least one of the software or hardware, wherein the hash value is provided during installation of the at least one of the software or hardware of the computing device during manufacturing of the computing device, wherein the verification data is encoded as the glyph, and wherein the glyph is displayed by the computing device as being embedded in content displayed by the computing device by being displayed in low contrast with respect to the content to integrate the glyph into the content;
retrieve a stored copy of the hash value from the memory, wherein the stored copy of the hash value is stored in the memory during the manufacturing of the computing device as being a verified hash value;
compare the hash value to the stored copy of the hash value; and
based upon the comparison verifying the hash value, control the scanning device to provide an indication that the at least one of the software or hardware of the computing device is verified as matching the at least one of the software or hardware that was verified during manufacturing of the computing device, wherein the indication is provided to confirm proper set-up of the computing device before the computing device is shipped.

2. The server system of claim 1, wherein the instructions, when executed by the processor, further cause the processor to one of i) receive the verification data from the scanning device encoded as the glyph, and decode the glyph to obtain decoded verification data, or ii) receive decoded verification data from the scanning device, wherein if the processor receives decoded verification data from the scanning device, the scanning device decodes the glyph.

3. The server system of claim 1, wherein the glyph encodes one of i) verification data associated with a wagering game playable on an electronic gaming machine communicatively coupled to the server system, or ii) data associated with a hardware device of the electronic gaming machine.

4. The server system of claim 1, wherein the glyph encodes verification data associated with a software version associated with a jurisdiction, and wherein the instructions, when executed by the processor, cause the processor to determine whether the software version is verified for the jurisdiction.

5. The server system of claim 1, wherein the server system is communicatively coupled to an electronic gaming machine, and wherein the instructions, when executed, further cause the processor to download at least one game to the electronic gaming machine in response to determining that the received verification data matches the stored copy of the verification data.

6. The server system of claim 1, wherein the glyph is generated based upon the hash value and is further displayed by the computing device away from elements a player of the computing device interacts with.

7. A method for verifying software or hardware, the method comprising:
receiving, by a processor of a server system, verification data from a scanning device that scans a glyph to capture the verification data and is communicatively coupled to the server system via a computing network, wherein the verification data is received as part of a verification before a computing device is shipped, wherein the verification data is associated with at least one of software or hardware of the computing device and comprises a hash value of at least part of a verification identifier of the at least one of the software or hardware, wherein the hash value is provided during installation of the at least one of the software or hardware of the computing device during manufacturing of the computing device, wherein the verification data is encoded as the glyph and wherein the glyph is displayed by the computing device as being embedded in content displayed by the computing device by being displayed in low contrast with respect to the content to integrate the glyph into the content;
retrieving, by the processor, a stored copy of the verification data from a database communicatively coupled to the processor, wherein the stored copy of the hash value is stored in the database during the manufacturing of the computing device as being a verified hash value;
comparing, by the processor, the hash value to the stored copy of the hash value to verify the software or hardware associated with the verification data was installed; and
transmitting, by the processor and in response to the comparison verifying the hash value, data to the scanning device, the data indicating whether the at least one of the software or hardware is verified as matching the at least one of the software or hardware that was verified during manufacturing of the computing device, wherein an indication is provided by the scanning device to confirm proper set-up of the computing device before the computing device is shipped.

8. The method of claim 7, further comprising one of i) receiving, by the processor, the verification data from the scanning device encoded as the glyph, and decoding the glyph to obtain decoded verification data, or ii) receiving, by the processor, decoded verification data from the scanning device, wherein if the processor receives decoded verification data from the scanning device, the scanning device decodes the glyph.

9. The method of claim 7, wherein the glyph encodes one of i) verification data associated with a wagering game playable on an electronic gaming machine communicatively coupled to the server system, or ii) data associated with a hardware device of the electronic gaming machine.

10. The method of claim 7, wherein the glyph encodes verification data associated with a software version associated with a jurisdiction, the method further comprising determining, by the processor, whether the software version is verified for the jurisdiction.

11. The method of claim 7, wherein the server system is communicatively coupled to an electronic gaming machine, the method further comprising downloading, by the processor, at least one game to the electronic gaming machine in response determining that the software or hardware is verified.

12. The method of claim 7, wherein the glyph is generated based upon the hash value and is further displayed by the computing device away from elements a player of the computing device interacts with.

13. The method of claim 7, wherein the hash value is associated with at least one of a game code segment of at least one game and a serial number of the at least one game.

14. An article of manufacture comprising a tangible, non-transitory, computer-readable storage medium having instructions stored thereon, which when executed by a processor, cause the processor to at least:
receive verification data from a scanning device that scans a glyph to capture the verification data and is communicatively coupled to the processor via a computing network, wherein the verification data is received as part of a verification before a computing device is shipped, wherein the verification data is associated with at least one of software or hardware of the computing device and comprises a hash value of at least part of a verification identifier of the at least one of the software or hardware, wherein the hash value is provided during installation of the at least one of the software or hardware of the computing device during manufacturing of the computing device, wherein the verification data is encoded as the glyph, and wherein the glyph is displayed by the computing device as being embedded in content displayed by the computing device by being displayed in low contrast with respect to the content to integrate the glyph into the content;
retrieve a stored copy of the hash value from a memory communicatively coupled to the processor, wherein the stored copy of the hash value is stored in the memory during the manufacturing of the computing device as being a verified hash value;
compare the hash value to the stored copy of the hash value to verify the software or hardware was installed; and
communicate, in response to the comparison, data to the scanning device, the data indicating whether the at least one of the software or hardware is verified as matching the at least one of the software or hardware that was verified during manufacturing of the computing device, wherein an indication is provided by the scanning device to confirm proper set-up of the computing device before the computing device is shipped.

15. The article of claim 14, wherein the instructions, when executed by the processor, further cause the processor to one of i) receive the verification data from the scanning device encoded as the glyph, and decode the glyph to obtain decoded verification data, or ii) receive decoded verification data from the scanning device, wherein if the processor receives decoded verification data from the scanning device, the scanning device decodes the glyph.

16. The article of claim 14, wherein the glyph encodes one of i) verification data associated with a wagering game playable on an electronic gaming machine communicatively coupled to a server system, or ii) data associated with a hardware device of the electronic gaming machine.

17. The article of claim 14, wherein the glyph encodes verification data associated with a software version associated with a jurisdiction, and wherein the instructions, when executed by the processor, cause the processor to determine whether the software version is verified for the jurisdiction.

18. The article of claim 14, wherein the instructions, when executed, further cause the processor to download at least one game to an electronic gaming machine communicatively coupled to the processor in response to determining that the software or hardware is verified.

19. The server system of claim 1, wherein the glyph is displayed away from elements a player at the computing device interacts with by being displayed in a corner of a display device of the computing device.

\* \* \* \* \*